Nov. 2, 1948.   L. A. WOOD, JR   2,452,821
METHOD OF MAKING PHONOGRAPH RECORDS
Filed June 29, 1944
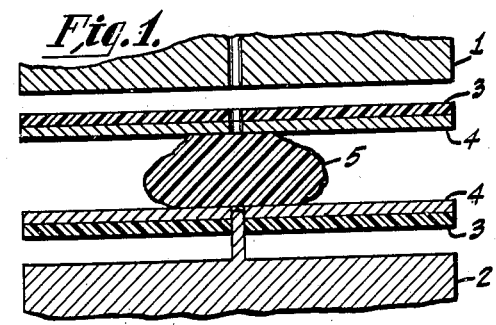
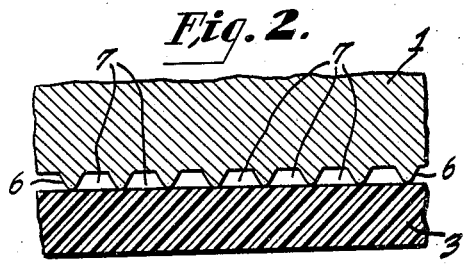
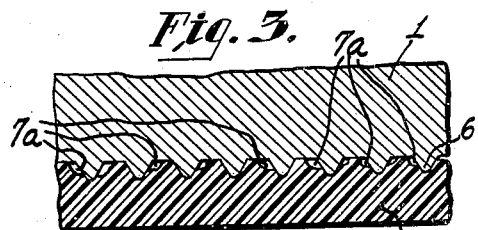
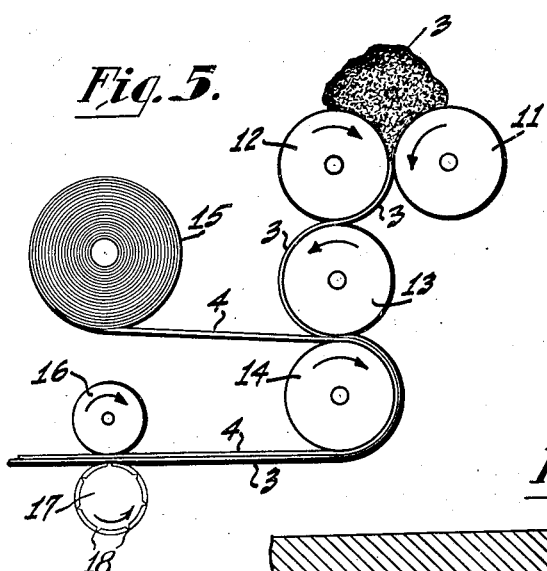
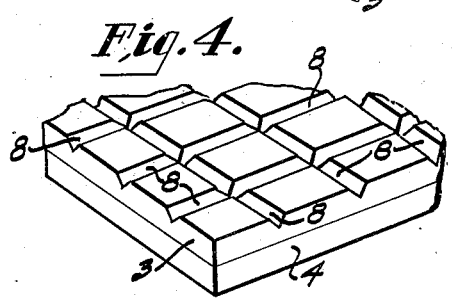
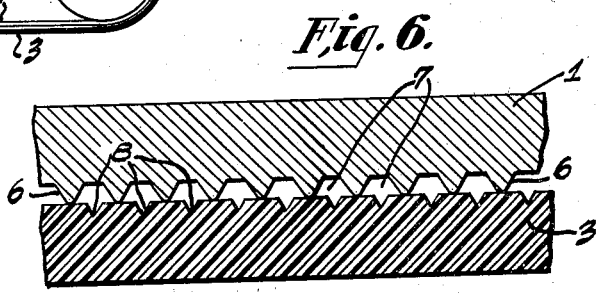
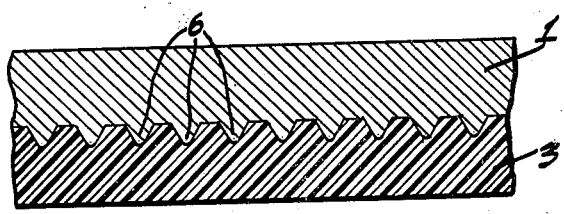
Inventor
LAWRENCE A. WOOD, JR
By
C. A. Puska
Attorney Patented Nov. 2, 1948

2,452,821

UNITED STATES PATENT OFFICE 2,452,821

METHOD OF MAKING PHONOGRAPH RECORDS

Lawrence A. Wood, Jr., Indianapolis, Ind., assignor to Radio Corporation of America, a corporation of Delaware Application June 29, 1944, Serial No. 542,723

6 Claims. (Cl. 18—48.4)

This invention relates to a method of making phonograph records, and more particularly to an improved method of forming a laminated record of the disc type.

Various materials have been proposed heretofore for the manufacture of laminated phonograph records. Among such materials is a paper backed plastic sheet which, in the course of molding the record in a record press, is bonded to or laminated with a suitable core material. The paper backed surface layer may comprise any suitable plastic material which can be molded readily, such as one of the vinyl copolymers.

These coated paper discs may be prepared by several methods. One such method is to apply the plastic surface layer to the paper by means of heated calender rolls. This treatment results in a surface layer which has a very smooth surface. In the case of vinyl copolymers and other plastics of similar flow characteristics, difficulty is frequently encountered during the record molding operation in the press in that air or other gases are trapped between the record pressing matrix and the highly smooth or polished record surface material. The entrapped gas results in unfilled spots or pockets which are more or less microscopic in size and are known as "ticks" inasmuch as they produce a sound similar to a tick during reproduction. This distortion is, of course, highly undesirable. I have found that this effect can be eliminated by proper roughening of the plastic surface before molding.

The primary object of my present invention, therefore, is to provide an improved laminated phonograph record and an improved method of forming the same which will be free from the aforementioned defect.

More particularly, it is an object of my present invention to provide an improved method of forming a disc record the surface of which will be free from indentations or the like normally resulting from the pressure of entrapped gas thereagainst during the molding operation.

Another object of my present invention is to provide an improved method of preparing phonograph record surfacing material for laminated disc records which can be used successfully in the manufacture of records as above set forth.

A further object of my present invention is to provide, in the method of molding phonograph records with the aid of a molding matrix, a novel step which results in finished records free from pockets or other indentations as above described.

Still another object of my present invention is to provide an improved method of forming a phonograph record as aforesaid which will afford improved quality of reproduction.

In accordance with my present invention, the plastic surface layer is roughened, as by means of coarse sandpaper or by embossing with a knurling tool, prior to the molding operation. In practice, the sheets may be roughened with appropriately surfaced calendering or embossing rolls, or by pressing them between rough press platens. The exact degree of roughness is not critical, although it is preferable that the dimensions of the indentations formed on the plastic surface should be of the same order of magnitude as the dimensions of the record groove, for example, 0.001 inch to 0.004 inch. The indentations or recesses formed in the surface of the plastic sound groove receiving layer constitute a plurality of intercommunicating passages through which the entrapped air or other gases evolved during the molding operation can escape. These passages may be arranged over the surface of the plastic layer either according to a uniform or regular pattern, or they may be arranged more or less indiscriminately and haphazardly over the surface of the plastic layer. The important thing is to provide one or more passages which will permit the escape of gas which would otherwise become entrapped between the molding matrix and the plastic sheet. In some cases, it may even be sufficient to provide merely a matted finish on the surface of the plastic layer in place of its usual highly polished, smooth surface. Calender coated discs of vinyl copolymers on paper, laminated under a wide variety of pressing and preheating cycles, were found to fill out properly in accordance with my present invention when the surfaces thereof were roughened as above set forth.

The novel features that I consider characteristic of my invention are set forth with particularity in the appended claims. The invention itself, however, both as to its organization and method of producing the same, as well as additional objects and advantages thereof, will best be understood by reference to the accompanying drawing, in which Figure 1 is an exploded, sectional view of a record press with a charge therein for forming a laminated record of the type under consideration, Figure 2 is a fragmentary sectional view showing the record pressing matrix brought down into contact with a plastic material having a smooth surface, as in the case of conventional, prior art records, Figure 3 is a similar view showing the position of the matrix when the press is fully closed and with the air pockets trapped between the matrix and the record, Figure 4 is a fragmentary, perspective view of a paper backed, embossed plastic sheet formed according to my present invention and showing the channels or passageways which permit escape of the normally trapped air, Figure 5 is a diagrammatic view showing how a paper backed layer with a plastic surfacing material such as that shown in Fig. 4 may be formed, Figure 6 is a view similar to Fig. 2, but showing the record pressing matrix as applied to an improved record material according to my present invention, and Figure 7 is a view similar to Fig. 3, but showing the matrix cooperating with a surfacing material according to my present invention.

Referring more particularly to the drawing wherein similar reference characters designate corresponding parts throughout, there is shown a record press having an upper matrix 1 and a lower matrix 2 between which is placed a charge of material for forming a laminated disc record. The charge may consist of a pair of spaced discs each having an outer sheet or layer 3 of suitable plastic material backed by a fibrous layer 4 of paper or the like, with an intermediate biscuit 5 of a suitable core material which is also plastic in nature, such as a mixture of shellac and filler, or a resin of the type disclosed in the Hunter Patent 2,130,239.

When the matrices 1 and 2 are brought into engagement with the plastic surface layers 3, the ridges 6 on the matrices, which form the sound grooves in the plastic layer 3, first engage and press into the highly polished, smooth surfaces of the layers 3, as seen from Fig. 2. Between the ridges 6 are pockets 7 in which air and, in some instances, other gases evolved from the materials 3 and 5 during the molding operation, become trapped. As pressure is applied to the matrices 1 and 2, the gas entrapped in the pockets 7 is forced against the surface layer 3 and results in irregularly shaped spots or pockets 7a in the side walls of the record groove. These spots, although microscopic in size, nevertheless manifest themselves during reproduction by distortion of the recorded signal in the form of ticks, clicks, or the like.

To eliminate this defect, the surface layers 3 are formed with a plurality of indentations or recesses 8 through which the trapped gases can escape during the molding operation. The recesses or the like 8 may be formed in a more or less regular pattern over the surface of the layer 3, or in an irregular and indiscriminate fashion, as may be found most suitable. By way of illustration, I have shown the layer 3 in Fig. 4 as provided with a plurality of sets of channels 8, each set including a plurality of parallel rows, and the rows of each set intersecting each other.

The channels or the like 8 may be formed in the material 3 by means of a suitable embossing roll, for example. In Fig. 5, there is shown diagrammatically a four-high calender roll comprising heated rollers 11, 12, 13 and 14. The material of which the layers 3 are made (such as vinyl resin, or any other suitable plastic material) may be applied between the upper rolls 11 and 12 which rotate in opposite directions as shown by the arrows applied thereto. The roll 12 carries the material 3 to the roller 13 which, in turn, applies it to a web or strip of paper 4 fed from a roll 15 and passing around the roller 14. The plastic coated paper 3, 4 then passes from the roller 14 between a pair of rollers 16 and 17. The roller 16 is smooth, while the roller 17 may be provided with ridges 18 which form the channels 8 in the layer 3 to a depth preferably less than the thickness of the layer 3, whereby the bottoms of the channels 8 are spaced from the backing layer 4. The depth, width, and shape of the channels or recesses 8 are not critical. By way of example, it may be pointed out that I have successfully used a coated sheet 3, 4 in which the channels 8 were approximately V-shaped in cross section and had a maximum width of 0.0015 inch and a depth of 0.0015 inch. In this particular case, the channels 8 were separated from each other on centers of approximately 0.01 inch. When a surface layer 3 having recesses as above described is employed, the gases which might otherwise be trapped are forced out along the channels 8 to the atmosphere, and the pockets or ticks 7a are entirely eliminated.

From the foregoing description, it will undoubtedly be apparent to those skilled in the art that I have provided a novel and highly effective method of eliminating ticks and other similar defects in molded records resulting from entrapped gas. An improved record formed according to my present invention is shown in Fig. 7, from which it will be seen that the pockets or spots 7a are entirely absent.

Although I have described the present invention with particular reference to a laminated record, it will be understood that my invention is applicable to other types of records, such as solid, single stock records as well. It is particularly applicable to solid records molded from smooth, plastic pre-forms, such as records molded from relatively thick, smooth sheets of vinyl polymers, methyl methacrylate, or cellulose esters or ethers. Where the records are of the laminated type, surface layers of nitrocellulose, cellulose acetate, or of resinous, plastic materials other than vinyl copolymers may be employed. Moreover, while I have illustrated the recesses 8 in the form of channels, it will be apparent that other forms of depressions or indentations may be provided in the surface of the layers 3. Other changes will, no doubt, readily suggest themselves to those skilled in the art. I therefore desire that my invention shall not be limited except insofar as is made necessary by the prior art and by the spirit of the appended claims.

I claim as my invention:

1. A method of producing a phonograph record from a blank having a substantially continuous playing surface comprising a thermoplastic material, said method comprising providing said surface with a plurality of grooved passages intercommunicating with each other and with the edge of said blank and impressing a grooved sound track in said surface with sufficient heat and pressure to completely eliminate said intercommunicating passages.

2. The invention set forth in claim 1 characterized in that said passages are of the order of 0.001 inch to 0.004 inch in cross section.

3. The invention set forth in claim 1 characterized in that said passages are of the order of 0.0015 inch in maximum width and 0.0015 inch in maximum depth, and characterized in that they are spaced from each other on centers of approximately 0.01 inch.

4. The invention set forth in claim 1 characterized in that said passages comprise channels which are arranged in a plurality of rows, said channels intersecting each other.

5. The invention set forth in claim 1 characterized in that said passages comprise channels which are arranged in a plurality of sets of rows, the channels of one set intersecting the channels of another set, and the channels of any one set being spaced from each other on centers of approximately 0.01 inch.

6. The method set forth in claim 1 characterized in that said passages are arranged indiscriminately over the surface of said material.

LAWRENCE A. WOOD, Jr.

REFERENCES CITED

The following references are of record in the file of this patent:

UNITED STATES PATENTS

| Number | Name | Date |
|---|---|---|
| 1,050,932 | Emerson | Jan. 21, 1913 |
| 1,146,413 | Edison | July 13, 1914 |
| 1,283,450 | Aylsworth | Nov. 5, 1918 |
| 1,454,939 | Michaelsen | May 15, 1923 |
| 1,751,546 | Glidden | Mar. 26, 1930 |
| 1,881,803 | Mattison | Oct. 11, 1932 |
| 1,997,572 | Bren | Apr. 6, 1935 |
| 2,016,568 | Zinser | Oct. 8, 1935 |
| 2,184,524 | Hofmann | Dec. 26, 1939 |
| 2,208,494 | Broderson | July 16, 1940 |
| 2,232,664 | Neiley | Feb. 18, 1941 |

FOREIGN PATENTS

| Number | Country | Date |
|---|---|---|
| 333,175 | Great Britain | Aug. 5, 1930 |
| 497,908 | Great Britain | Dec. 30, 1938 |